United States Patent [19]

Ramer

[11] 4,203,410
[45] May 20, 1980

[54] METHOD FOR OPERATING A ROTARY ENGINE

[76] Inventor: James L. Ramer, 401 W. Newhall Ave., Waukesha, Wis. 53186

[21] Appl. No.: 913,415

[22] Filed: Jun. 7, 1978

Related U.S. Application Data

[63] Continuation of Ser. No. 740,270, Nov. 9, 1976, abandoned.

[51] Int. Cl.$^2$ .................. F02B 53/08; F02B 53/10
[52] U.S. Cl. ................................ 123/205; 123/236
[58] Field of Search .............. 123/59 EC, 64, 203, 123/205, 215, 236

[56] References Cited

U.S. PATENT DOCUMENTS

| | | | |
|---|---|---|---|
| 1,105,076 | 7/1914 | Hayden | 123/236 |
| 1,727,860 | 9/1929 | Carlson | 123/25 C |
| 2,114,674 | 4/1938 | Buckbee | 123/236 |
| 3,693,601 | 9/1972 | Sauder | 123/203 |
| 3,782,110 | 1/1974 | Kobayashi | 123/203 |
| 3,921,595 | 11/1975 | Saunders | 123/237 |
| 3,964,447 | 6/1976 | Normandin | 123/236 |
| 4,086,882 | 5/1978 | McCrum | 123/59 EC |

Primary Examiner—John J. Vrablik
Attorney, Agent, or Firm—Darrell E. Hollis

[57] ABSTRACT

A rotary engine has a housing and a pair of spaced, coaxial rotors in the housing connected for joint movement. Each rotor rotates in a separate rotor chamber, and each carries radially movable vanes, the outer edges of which engage the configured inner surface of the housing. An axially extending passage in the housing communicates the rotor chambers. The parts are few in number and readily made.

A method of operating such a rotary engine in either gasoline or diesel modes, includes the addition of additional fuel after initial combustion.

3 Claims, 3 Drawing Figures

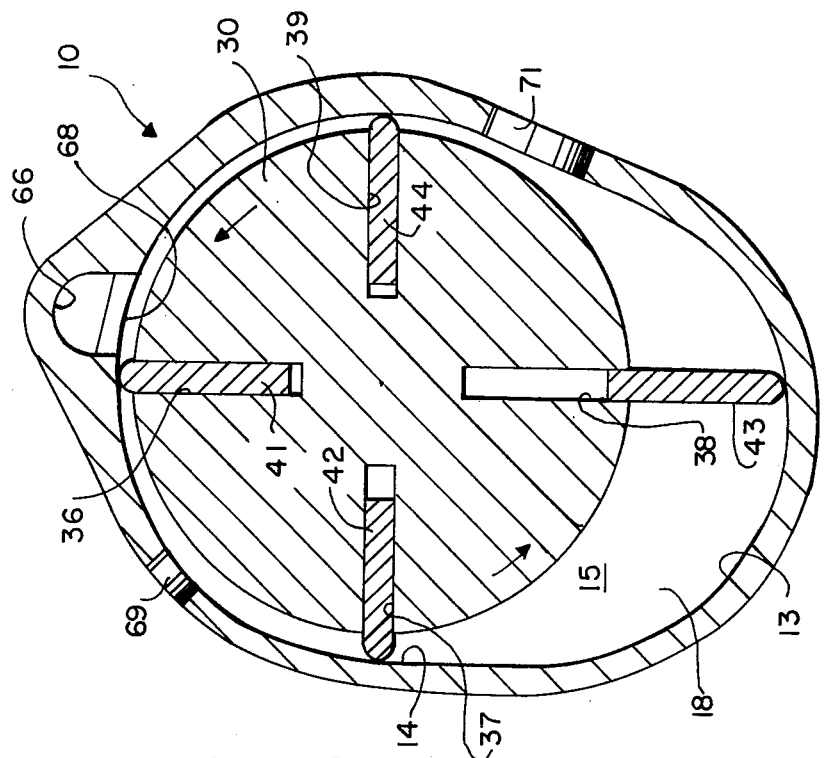
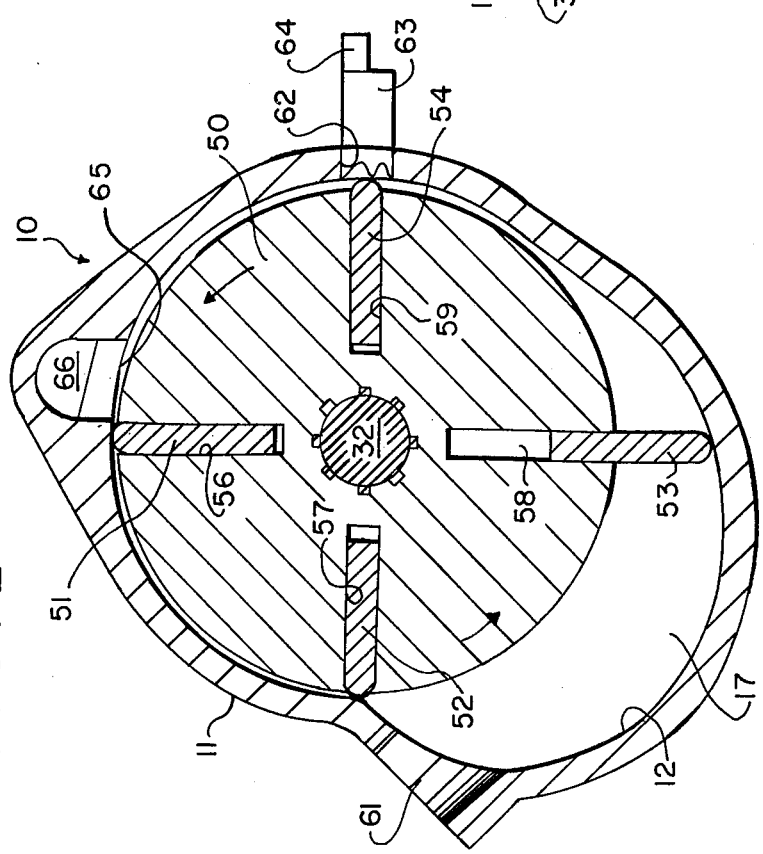

METHOD FOR OPERATING A ROTARY ENGINE

This is a continuation of application Ser. No. 740,270, filed Nov. 9, 1976, now abandoned.

BACKGROUND OF THE INVENTION

The present invention relates a method of operating a rotary engine.

Rotary engines are known of several differing constructions. One type of rotary engine provides a casing having a non-right cylinder chamber therein, with a rotor rotating in the chamber and having a plurality of radially extending vanes, the vanes being free to move radially inwardly and outwardly as they rotate with the rotor. Due to the configuration of the peripheral wall of the chamber, the spaces within the chamber which are defined by a pair of vanes, the exterior rotor surface, and the interior wall of the casing or housing, are enlarged or contracted, as the rotor rotates. This is known to provide compression and then expansion, so that fuel may be introduced into the chamber, first for compression, then ignition, and followed by expansion and exhaust from the chamber.

In another form of rotary engine, rotors were provided of trochoidal shape, with the chambers also being of trochoidal shape, the rotors moving in a planatary manner and forming pistons having rolling contact with the peripheral wall of the trochoidal chambers. These latter types of rotary engines were sometimes suggested as having a somewhat more complex form than that of a single rotor in a single chamber.

Thus, a known rotary engine of the trochoidal type provided a pair of chambers substantially coaxial, and each providing a substantially complete engine. In addition, there was a generally axially extending conduit that served to connect the two chambers, but communication between the two separate engines was prevented by a piston which was caused to move back and forth into the conduit by an unbalanced pressure on one side or the other. In another configuration of this same type, the first rotor and chamber served as a compressor which was driven by the engine shaft of the second rotor and chamber, for introducing compressed air into the chamber of the second rotor, in which it was burned and then exhausted.

In another complex arrangement of a trochoidal type rotary engine, dual chambers were provided, with rotors in each chamber, and with the axes of the rotors in spaced, parallel relationship, rather than being in substantially coaxial relationship as in the type hereinabove noted. In such engines, a fuel-air mixture was introduced into one chamber, where it was compressed and ignited, and then ignited gas mixture was discharged from the first chamber and introduced into the second chamber, where it served to drive the rotor in the second chamber, after which the ignited gases, having been expanded, were exhausted.

The rotary engines with radially movable vanes in the rotor are of relatively simple construction, and are easy to make, and while they are simple in operation, they are not as efficient as is desired. On the other hand, the trochoidal type rotary engines are more complex, requiring carefully machined surfaces of the rotor and chamber and only in those embodiments in which the shafts are in parallel, spaced relationship have there been the more effective operation in which the power stroke and exhaust is in a chamber separate from the intake, compression and ignition functions. In those embodiments in which a pair of trochoidal chambers are placed in substantially coaxial alignment, there has not been the noted separation of functions, but only the utilization of this structure for either separate engines, or for a pre-compression operation, but not the noted efficient separation of functions or cycles as noted.

SUMMARY OF THE INVENTION

A rotary engine is provided having radially movable vanes mounted in a rotor, there being provided a pair of rotors, each in its own chamber. The functions of intake, compression and ignition take place in a first chamber, and the functions of expansion and exhaust take place in the second chamber. The burning gases which are exhausted from the first chamber are conducted through a passage in the housing within which the rotors rotate, which passage extends generally parallel to the axis of the rotors, the rotors themselves being coaxial. In addition, the rotary engine herein disclosed is made of a few simple parts, comprising principally a housing which is of non-right cylindrical configuration having configured internal walls and a transverse wall for separating the two chambers. There are also provided a pair of end walls for closing off the ends of the chambers, and a first rotor made of a single, continuous piece of metal with a shaft extending therefrom and being of the same continuous piece of metal. The second rotor is secured to the shaft, the shaft and second rotor being splined for joint rotary movement. An inlet port is provided to the first chamber, and there is also provided in the first chamber an igniter, such as a spark plug. Optionally, there may also be provided adjacent the spark plug a fuel introducing device. In the second chamber, in addition to the inlet for the burning gases from the first chamber, and an exhaust or outlet port, there is provided a second inlet port for the introduction of additional fuel. Further, the shaft, which extends through an opening in the transverse wall, is provided with a cam surface at the portion thereof which lies within the transverse wall, and the transverse wall itself has a generally radially extending passage which contains a cam follower rod that has one end in engagement with the cam surface of the shaft and the other end exteriorly of the housing. The rotor has, in addition, a shaft extending oppositely from the first mentioned shaft, for the delivery of power.

Among the objects of the present invention are to provide a rotary engine which is of extremely simple construction, which may be readily built, and which requires only very simple machine tools. For example, it is an ancillary object of the present invention to provide such an engine which may be built principally with a small lathe with milling attachments. Consequently, an object of the present invention is to provide such an engine which is suitable for production in areas having limited industrial equipment.

A further object of the present invention is to provide a rotary engine which will be simple to maintain, and of low cost to manufacture, thereby permitting it to be used in areas remote from support and maintenance personnel.

Still further objects of the invention are to provide such a rotary engine, which will have very good fuel economy, which can be adapted for either gasoline or diesel useage with the same basic structure, and which is even suitable for use with external combustion operation.

A still further object of the present invention is to provide such a rotary engine which will have a substantially constant power delivery, with smooth power output.

BRIEF DESCRIPTION OF THE DRAWING

FIG. 2 is a transverse cross sectional view taken on the line 2—2 of FIG. 1.

FIG. 3 is a transverse cross sectional view taken on the line 3—3 of FIG. 1.

DESCRIPTION OF THE PREFERRED EMBODIMENTS

Figure 1:
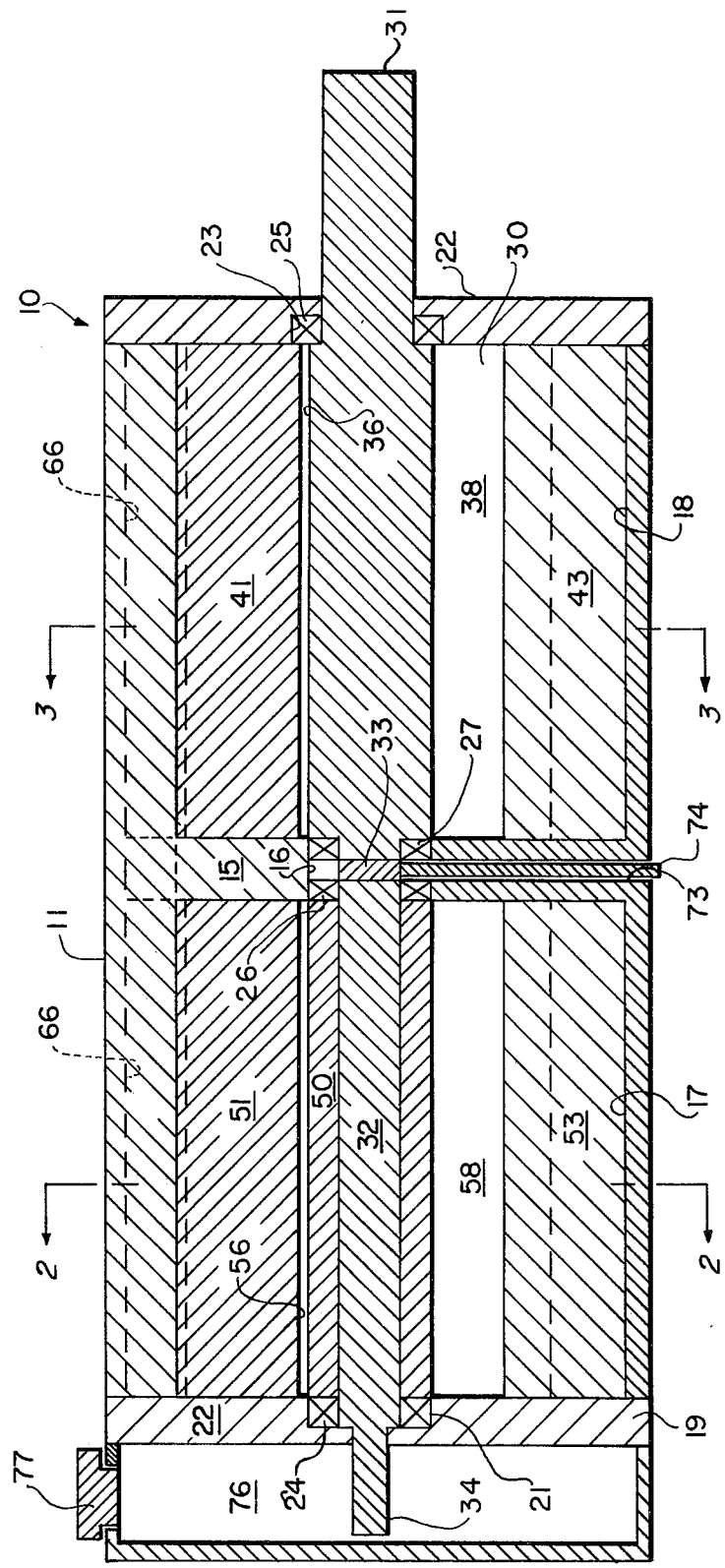
FIG. 1 is an axial cross sectional view of a rotary engine in accordance with the present invention.

Referring now to the drawings, wherein like or corresponding reference numerals are used to designate like or corresponding parts throughout the several views, there is shown in FIG. 1 a rotary engine generally designated 10, and comprising a housing 11. Housing 11 consists of a single continuous block of metal generally in the form of a non-right cylinder housing, having longitudinal and transverse cross sections as indicated in the drawing. Thus, housing 11 as shown best in FIG. 2 has the upper half thereof of generally right-cylindrical transverse cross section, but has the lower half thereof configured, so that the internal walls 12 as shown in FIG. 2, and 13 as shown in FIG. 3 are not concentric with the axis, as is, for example, the upper part of the housing 11 as shown in FIG. 2. In addition, there is a portion 14 of the interior wall, as shown in FIG. 3, which is also non-concentric with the axis.

Referring again to FIG. 1, in addition to the peripherally extending wall 12 (shown in FIG. 2), the housing 11 has a transverse intermediate wall 15 which is provided with an axially extending central opening 16. The wall 15 thereby serves to divide the interior of the housing 11 into a pair of rotor chambers, designated generally 17 and 18. The rotor chamber 17 has at its left as shown in FIG. 1 an open end, which is closed by an end plate 19, having a stepped bore 21 therein, located axially, the end plate 19 being secured to the housing 11 by any suitable means, not shown. Similarly, the open end of chamber 18 is closed by an end plate 22 which is similarly provided with a stepped bore 23, and which is also secured to the housing 11. In the stepped bore 21 there is provided a suitable bearing 24, and similarly in the stepped bore or opening 23 there is provided a bearing 25.

In the rotor chamber 18 there is provided a power rotor (see also FIG. 3) which consists of a single continuous cylindrical block of metal having a shaft 31 formed from the same piece of metal as the power rotor 30. The shaft 31, which is the power output shaft of the engine, is rotatably supported by the bearing 25, and extending from the power rotor 30 opposite to the shaft 31 is a shaft 32 having a cam surface 33 thereon which is located within the transverse wall 15, and having at its outer end the terminal shaft portion 34, which may be used for power take off, rotor position sensing, or drive of auxillary devices. Where the shaft 32 transverses the transverse wall 15, it is supported by bearings 26 and 27 carried in the stepped opening 16 of transverse wall 15.

Referring again to FIG. 3, the power rotor 30 is provided with radially extending slots 36, 37, 38 and 39, which are located at 90 degree intervals from each other. In each of the slots there is a radially movable vane, designated 41, 42, 43 and 44, respectively. When the power rotor 30 is rotating, these vanes are thrown outwardly by centrifugal force, and their outer ends engage the interior walls of the rotor chamber 18. In conventional manner, there is formed between each two vanes, the intervening outer surface of the rotor 30, and the interior wall of the housing 11 a chamber, there being four such chambers in the embodiment shown, and as the rotor 30 rotates, the volume of the chambers may expand, contract, and in some instances remain constant, for a portion of a revolution. Thus, assuming counter-clockwise motion as indicated by the arrows on the rotor 30 in FIG. 3, as the rotor 30 rotates, the chamber between the vanes 41 and 42 will expand, while the chamber between the vanes 43 and 44 will contract.

Referring now to FIG. 2, the shaft 32 may be seen, and is shown as a splined shaft. Spline-connected to shaft 32 is the intake rotor 50, which is in the chamber 17, and which is, like power rotor 30, made of a single continuous cylindrical block of metal, being provided with vanes 51, 52, 53 and 54 which operate in radial slots 56, 57, 58 and 59, respectively. The vanes of the intake rotor 50 operate generally in the same manner as the vanes of the power rotor 30, being thrown outwardly by centrifugal force, and limited by the engagement of their free ends with the interior walls of the housing 11 which extend peripherally, like the interior walls of the housing 11 which define in part the rotor chamber 18.

Housing 11 is provided with an inlet port 61 for the introduction of air, or, alternatively, for the introduction of an air-fuel mixture. Slightly less than 180° from inlet port 61 is a second port or ports 62, in which there is mounted an igniter 63. Where the material introduced into inlet port 61 is air, there is also provided a fuel injector 64, shown somewhat rearwardly of the igniter 63. Thus, the injector 64 would be utilized where, for example, the engine 10 is operating as a diesel engine, and air only is introduced into inlet port 61. On the other hand, if there is an air and fuel mixture introduced into the inlet port 61, then the injector 64 is inoperative, or may be eliminated.

The chamber 17 is also provided with an outlet port 65, shown located slightly less than 90° from the port 62, and to this is connected a duct 66, extending, as shown in FIG. 1, generally axially, being substantially parallel to the axis of the rotors 30 and 50. The duct 66 is formed by a passage in the housing 11, and communicates with an inlet port 68 formed in the chamber 18 (see FIG. 3). Chamber 18 is also provided with an auxillary inlet port 69 for the introduction of combustion augmenting material, specifically additional fuel. The chamber 18 is provided, finally, with an exhaust port 71 for exhausting products of combustion.

Referring again to FIG. 1, it may be seen that there is provided in the transverse wall 15 a passage 73, which is in registry with the cam surface 33 of the shaft 32. The shaft 73 extends from the exterior of the housing 11 to the opening 16, and there is provided in the passage 73 a cam follower rod 74, the inner end of which is in engagement with the cam surface 33, and the outer end of which is exteriorly of the housing 11, and may be used for timing operations, such as of the igniter 63, and where provided, the injector 64.

Attached to the outer surface of the end plate 19 is an oil reservoir 76, having filler cap 77, which may be used in conventional manner as a source for lubricating oil to be furnished to the engine 10.

In operation, and with counter-clockwise rotation, the intake rotor 50 will rotate so that vane 52 passes the inlet port 61, and due to the fact that the chamber between vane 52 and vane 51 is an expanding chamber, because of the configuration of the internal wall 61 at and past the inlet port 61, air will be drawn into the inlet rotor chamber 17; alternatively, an air and gas mixture will be drawn in. The chamber between vanes 52 and 51 will expand, until vane 52 has rotated approximately 45° from the position shown in FIG. 2, after which that chamber will begin to contract, so that the gaseous material in the chamber will then begin to be compressed, such compression continuing until the vane 52 has reached and passed the port 62, and such compression will continue until the vane 51 is approximately 45° in advance of the port 62. Once the vane 51 has reached the last noted position, or perhaps somewhat before that position, the igniter 63 will be energized, to thereby ignite the gaseous mixture in the chamber between the vanes 51 and 52. Where the operation is of the diesel type, the fuel will not be introduced into the inlet port 61 with the air, as is the case with a gasoline internal combustion rotary engine, but the fuel will be injected through the fuel injector 64, and this will be into a chamber containing compressed air. Thus, in the diesel mode, when the igniter is fired, it causes the burning of the combustible mixture. As will be understood, in addition, once operation has started, and the parts are sufficiently hot, operation of the igniter 63 may be dispensed with in the diesel mode.

The burning gases are permitted to escape through the gas port 65, once the vane 62 has reached gas port 65, and the burning gases, with substantially no expansion, will be introduced into the duct 66, where those burning gases will pass to the chamber 18 in which is located the power rotor 30, discharging into the chamber 18 through the inlet port 68. As will be understood, there is momentum to the rotating parts of the engine 10 in the counter-clockwise direction, and the burning and super-heated gases from the intake chamber 17 will enter the chamber 18, and after a few degrees of rotation from the position shown in FIG. 3, there will be more area of the vane 41 exposed to the pressure of the gases than of the vane 44, thereby adding to the driving force, the expanding gases driving the vane 41 in the counter-clockwise direction noted. Once vane 41 has passed the inlet port 69, the burning is augmented by additional fuel, and the expansion of the gases continues, the chamber between the vanes 41 and 44 increasing in volume during this period, and indeed, the chambers between these vanes increasing until vane 41 has travelled through approximately 180° from the position shown in FIG. 3. Further rotation will then cause compression of the expanded, burned gases in the chamber between vane 41 and vane 44, and when vane 41 has reached the exhaust port 71, the gases will be exhausted therethrough, from the chamber between vane 41 and vane 44, until vane 44 has passed the exhaust port 71.

The entire engine 10, except for such things as the bearings and accessory parts such as igniters, etc., may be manufactured with great economy, and may be readily manufactured with simple machine tools. Thus, the machining may be of a block of metal for the housing 11, and blocks of metals for the power rotor 30, including shafts 31, 32 and 34. Also, the intake rotor 50 may be made of a single block of metal on such machinery. Thus, the herein disclosed rotary engine is most suitable for production and/or repair in areas where there is very limited productive capacity, such as in developing countries, or in the field, in support of an army. The herein disclosed engine is extremely simple to maintain, as well as being simple and uncomplicated to manufacture.

As hereinabove noted, the engine 10 can be operated in either the gasoline or diesel mode, and, in addition, it is possible to operate the engine as an external combustion engine or with compressed air with just the power rotor 30, if the duct 66 is closed off and burning gases or compressed gases are introduced through the port 69. The engine provides for constant power delivery, with smooth power output, and provides very good fuel economy, due to the separation of the intake, compression and ignition functions, on the one hand, and the power (expansion) and exhaust functions on the other hand.

It will be obvious to those skilled in the art that various changes may be made without departing from the spirit of the invention, and therefore the invention is not limited to what is shown in the drawings and described in the specification but only as indicated in the appended claims.

What is claimed is:

1. A method of operating a rotary engine having first and second rotors each rotating in a separate chamber, each rotor carrying radially movable vanes, and each chamber having peripherally extending configured walls to determine the extent of radial movement of the vanes said method comprising:
   (a) introducing air into a first chamber,
   (b) compressing said air upon rotation of said first rotor,
   (c) adding fuel into said first chamber,
   (d) igniting the compressed air and fuel,
   (e) discharging the combustion products from said first chamber without expansion thereof in said first chamber,
   (f) introducing the discharged combustion products into said second chamber,
   (g) adding additional fuel to the combustion products in said second chamber,
   (h) driving said second rotor by expansion of the combustion products and additional fuel in said second chamber, and
   (i) exhausting expanded combustion products from said second chamber.

2. The method of claim 1, wherein said fuel is added to said air prior to introducing said air into said first chamber.

3. The method of claim 1, wherein said fuel is added to said air after it is introduced into said first chamber.

* * * * *